Dec. 18, 1956  T. W. FITZGERALD ET AL  2,774,305
ROCKET STEERING SYSTEM
Filed July 9, 1952
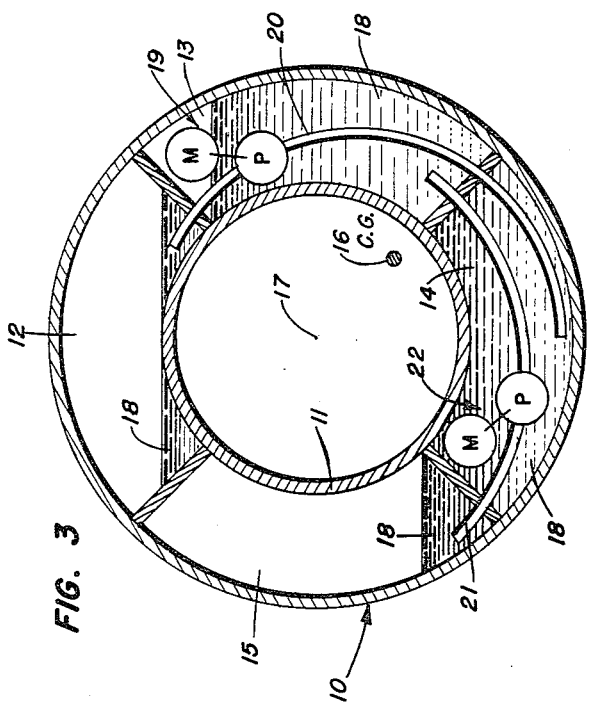
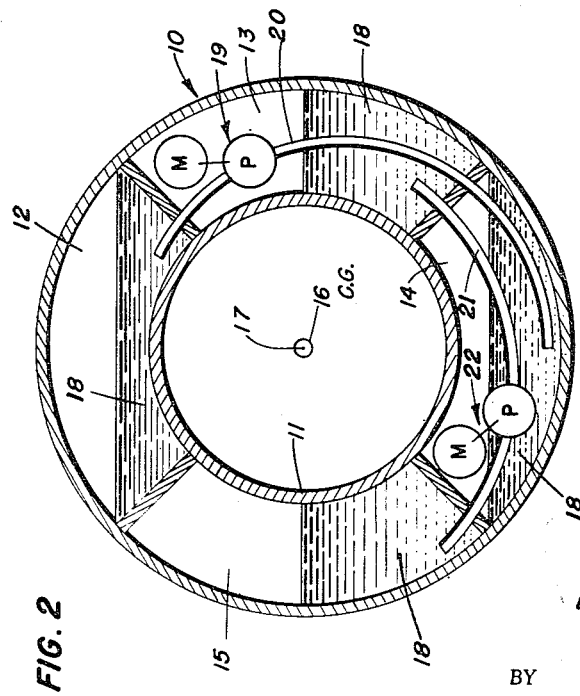
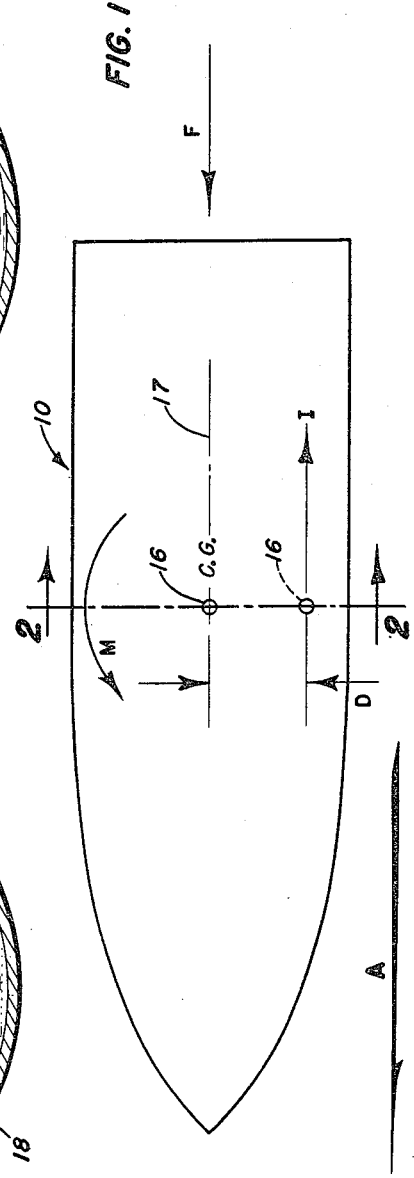
INVENTORS
THOMAS W. FITZGERALD
ROBERT W. FARREN
BY
ATTORNEYS

2,774,305

ROCKET STEERING SYSTEM

Thomas W. Fitzgerald, Kenmore, and Robert W. Farren, Williamsville, N. Y., assignors, by mesne assignments, to the United States of America as represented by the Secretary of the Navy Application July 9, 1952, Serial No. 297,936

1 Claim. (Cl. 102—49)

The invention relates to improvements in steering systems particularly well suited, but not necessarily limited to use in space rocket craft.

The primary object of the invention is to provide, in a thrust or reaction propelled vehicle moving through a fluid medium or a vacuum, means for steering the vehicle by displacement of its center of gravity.

Another object of the invention is the provision of steering means for a space rocket craft eliminating the need for steering jets.

Other objects and many of the attendant advantages of this invention will be readily appreciated as the same becomes better understood by reference to the following detailed description when considered in connection with the accompanying drawings wherein:

Fig. 1 is a diagrammatic side elevational view of a space rocket craft illustrating the steering effect obtained by shifting the center of gravity of the craft.

Figs. 2 and 3 are diagrammatic cross-sectional views taken substantially on the line 2—2 of Fig. 1 and showing the disposition of fluid fuel in Fig. 2 for symmetrical trimming of the craft and in Fig. 3 for radially offsetting the center of gravity thereof.

In the drawing which for the purpose of illustration shows only a preferred embodiment of the invention and wherein similar reference characters denote corresponding parts throughout the views, the numeral 10 generally designates a space rocket craft of circular shape in cross section and including an axial thrust duct 11 encircled by four fluid fuel compartments 12–15 in different quadrants of the craft. As shown in Figs. 2 and 3, compartments 12–15 are defined by radial partitions positioned at 45°, 135°, 225°, and 315° with respect to centerline 17, and by a common cylindrical inner wall, duct 11. The cylindrical outer wall of the individual compartments may be the outer cylindrical wall of the craft 10 as shown, or any suitable outer wall may be constructed apart from the outer wall of the craft 10 without deviating from the teaching of the instant device.

The steering system utilizes a controlled radial shift of the center 16 of gravity of the vehicle with relation to the centerline 17 of thrust during acceleration. This shift is accomplished by hydraulically, mechanically or otherwise moving fuel or ballast transversely of the craft. In the example shown, the fuel 18, used as liquid ballast, is forced as by a reversibly motorized pump 19 between the upper and lower fuel compartments 12, 14 through pipe 20, and between the right and left compartments 13, 15 through pipe 21 as by a reversibly motorized pump 22.

From an examination of Fig. 1 it is clear that the body of the craft 10 following an original straight path A will upon shifting of the center 16 of gravity out of alignment with the centerline 17 of thrust rotate in a direction M due to thrust F and inertia I as long as the center of gravity is displaced. As the body of the craft 10 rotates, force F compels the body to assume a new direction of travel. It will therefore be seen that use of the system in a space rocket craft eliminates the need for steering or stabilizing jets.

Obviously many modifications and variations of the present invention are possible in the light of the above teachings. It is therefore to be understood that within the scope of the appended claim the invention may be practiced otherwise than as specifically described.

What is claimed is:

A system for steering rocket-propelled vehicles in space by shifting the center of mass of the vehicle with respect to the vector of propelling thrust by controlled movement of liquid ballast comprising, a pencil-shaped rocket having a propelling means producing thrust directed rearwardly along the longitudinal centerline of the rocket, said rocket including a housing, four radially-positioned walled liquid storage compartments within the housing and defined by radial partitions located at 45°, 135°, 225°, and 315° with respect to the longitudinal centerline of the rocket, a common cylindrical outer wall and a common cylindrical inner wall for the compartments with each cylindrical wall being concentric with the centerline of the rocket, a first conduit situated so as to pass through the 315° and 45° partitions in order to establish communication between compartments joining the 315° and 45° partitions, a second conduit situated so as to pass through the 315° and 225° partitions in order to establish communication between compartments joining the 315° and 225° partitions, a first pump means located in the compartment bounded by the 315° and 45° partitions and operatively engaged to the first conduit, and a second pump means located in the compartment bounded by the 315° and 225° partitions and operatively engaged to the second conduit, the arrangement of the first and second conduits and the first and second pump means providing a means for selectively transferring liquid ballast from one compartment to another so as to shift the center of mass of the rocket with respect to the vector of propelling thrust to control the direction of flight of the rocket.

References Cited in the file of this patent

UNITED STATES PATENTS

| 855,466 | Mazer | June 4, 1907 |
| 1,258,279 | Veitch | Mar. 5, 1918 |
| 1,306,318 | Stupar | June 10, 1919 |
| 2,024,822 | Hort | Dec. 17, 1935 |

FOREIGN PATENTS

| 797,933 | France | Feb. 24, 1936 |